May 16, 1933.  R. J. MEYER  1,909,880
INTERNAL COMBUSTION ROTARY ENGINE
Filed July 26, 1930  4 Sheets-Sheet 2
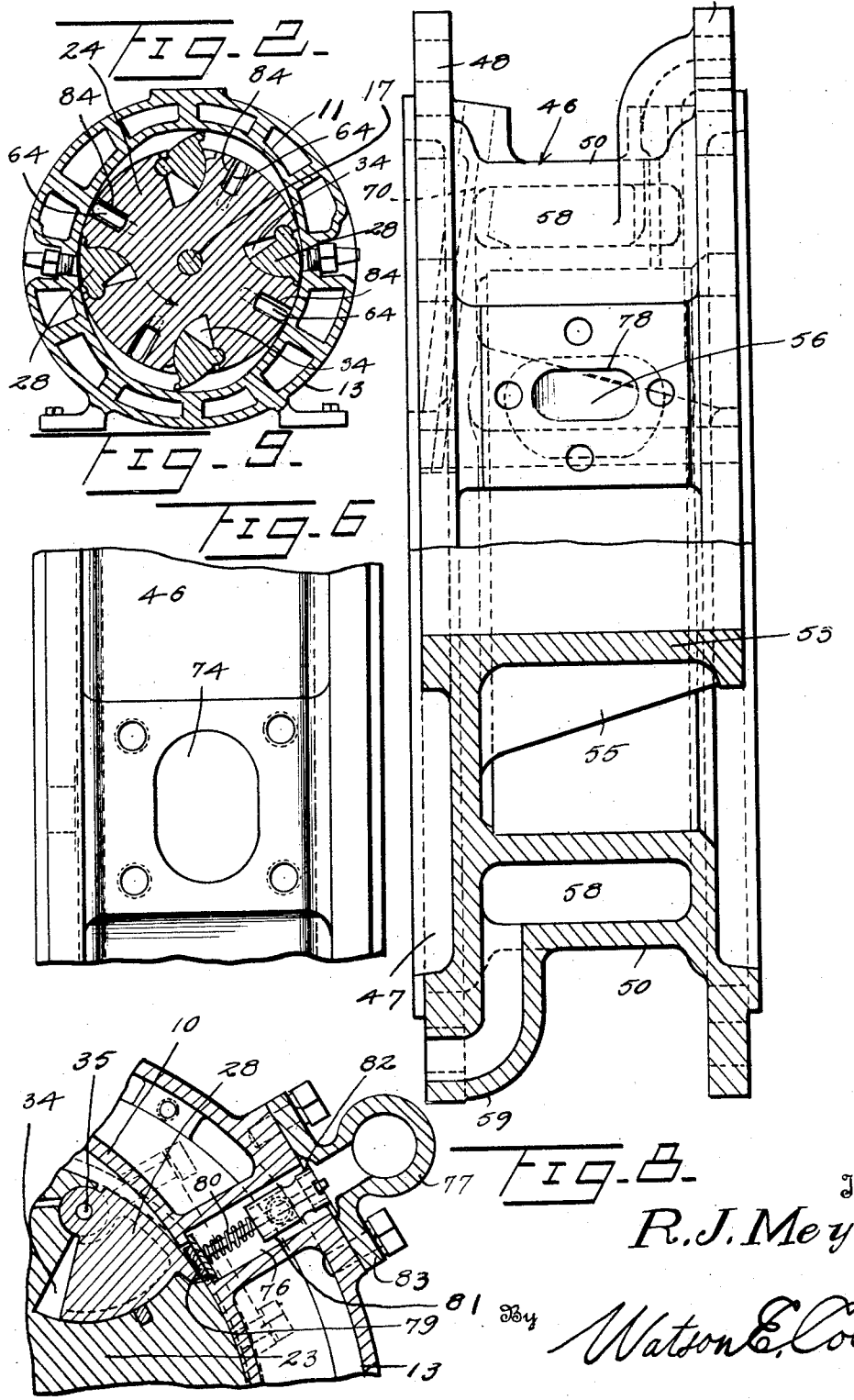

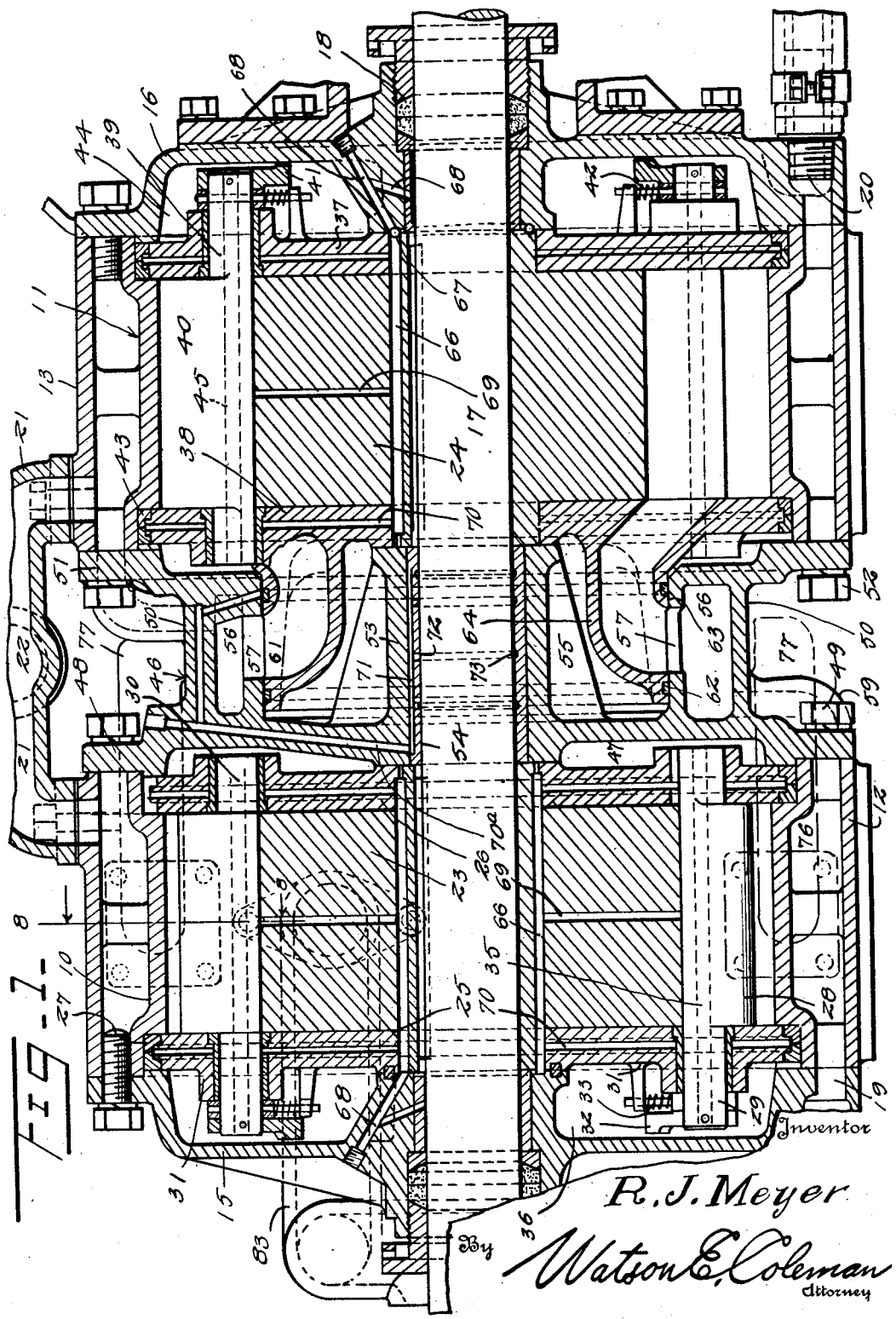

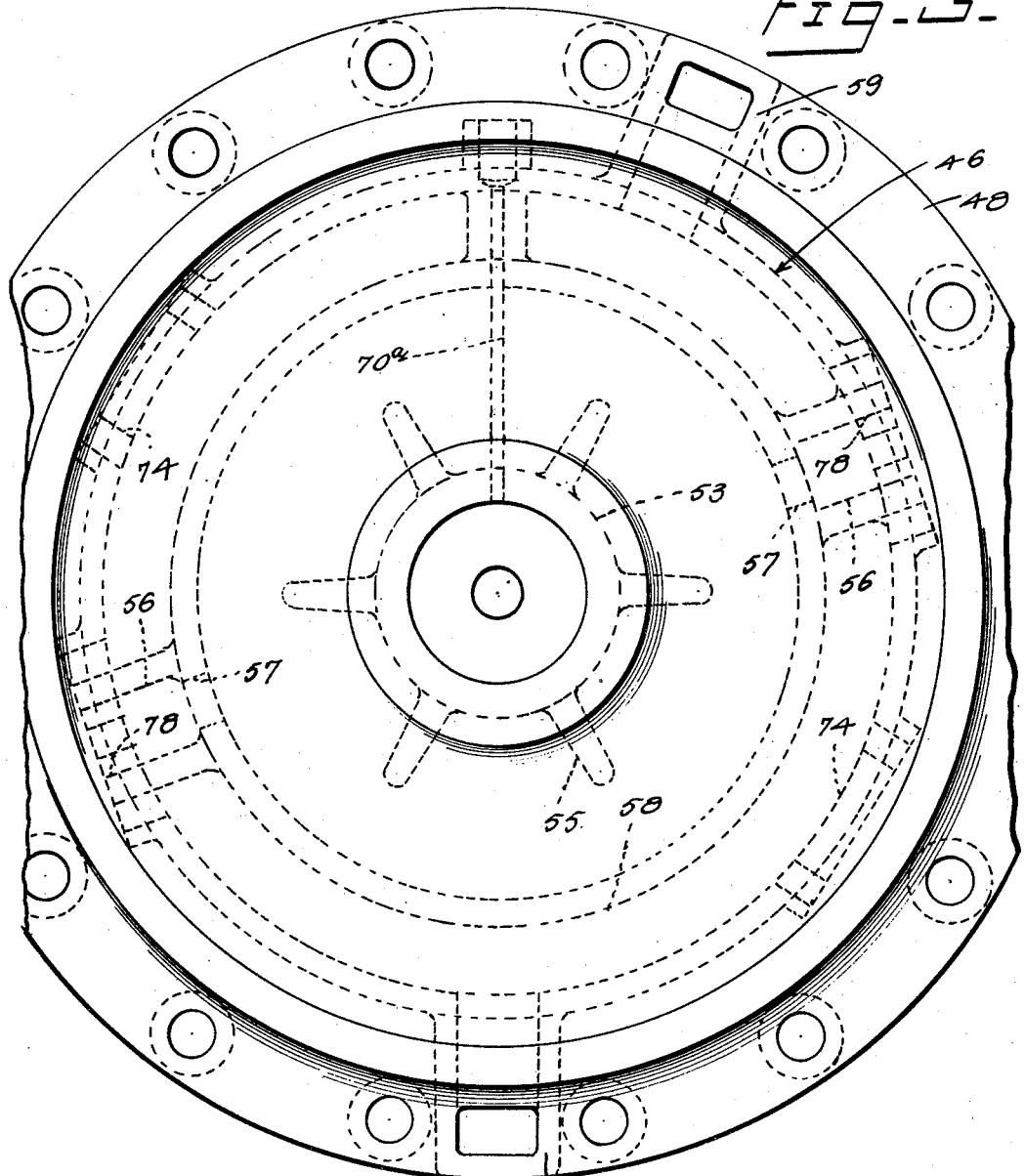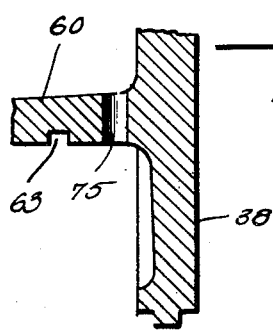

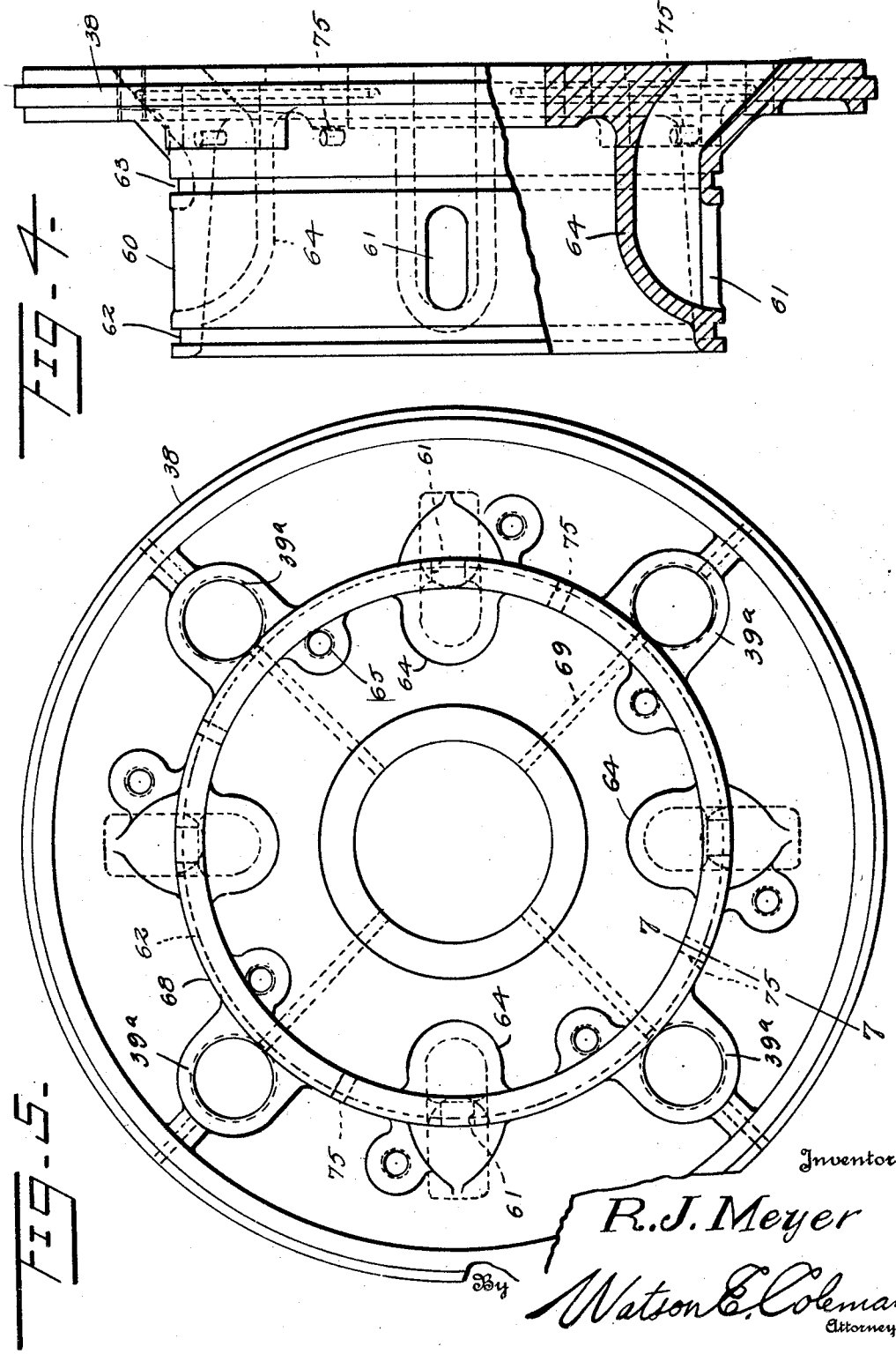

Patented May 16, 1933

1,909,880

UNITED STATES PATENT OFFICE

RALPH J. MEYER, OF DENVER, COLORADO

INTERNAL COMBUSTION ROTARY ENGINE

Application filed July 26, 1930. Serial No. 470,986.

This invention relates to internal combustion rotary engines and particularly to engines of that type in which a compressor and a rotor are used mounted upon the same shaft, the compressor compressing the fuel and forcing it in a compressed form into the rotor where it is exploded, the compressor being provided with pistons and the rotor of the motor being provided with pistons, the general construction of an invention of this type being fully shown in my pending application for patent, Serial No. 356,541, filed on the 19th day of April, 1929.

In this pending application, a manifold pipe was shown leading from the compressor to the motor casing and the compressor acted to compress the motive fluid into this manifold pipe from which it is discharged directly to the motor. In this construction, the motive fluid came in contact with the more or less heated walls of the rotor, and one of the main objects of the present invention is to provide means whereby this compressed charge is kept cool and thereby prevented from expansion under the action of the heat until it has been received by the motor and in the course of events exploded.

A further object in this connection is to provide a spacing element between the compressor and the motor which is so constructed that the charge passing from the compressor shall pass into this spacing element and from thence into the motor, thus keeping the charge cool and preventing it from expanding under heat and another object in this connection is to provide a water jacket surrounding this spacing element whereby the spacing element may be kept cool.

Another object is to provide a spacing element of this character having a duct or manifold in the spacing element into which the charge may be compressed and provide a check valve at the entrance of this duct or manifold which will permit the pressure to be built up within this manifold or duct to any desired working degree.

A further object is to provide means for equalizing pressure at each end of each rotor which means as associated with one rotor is entirely independent of the like means as associated with the other rotor, thus providing an individual pressure balancing means for each rotor and particularly to provide a construction in which a large area on the rotors or on the baffle plates thereof is subjected to the action of pressure.

A further object is to provide a spacing member which is attached to the casings of the compressor and motor and which is formed with a circumferential chamber opening toward the rotor of the motor and provide one of the baffle plates of the last named rotor with an inwardly projecting annular portion fitting against the outer wall of the spacing member and having an inlet port alining wtih the outlet ports of said spacing member and provide annular rings intersecting said inlet ports, thus providing for a greater pressure being obtained on the outside of said rings than on the inside so that there will be no leakage past said rings. By this construction a greater pressure is secured on the outside of these rings than on the insides thereof, whereby if there is any leakage, the leakage will be from the exterior of the rings to the interior and thus into the inlet ports, thus preventing any escape of gas under compression from the spacer.

Other objects will appear in the course of the following description.

My invention is illustrated in the accompanying drawings, wherein:—

Figure 1 is a diametrical section through an internal combustion engine constructed in accordance with my invention;

Figure 2 is a view partly in section and partly in elevation of the spacing member;

Figure 3 is an elevation of the spacing member looking toward that face of it which confronts the compressor;

Figure 4 is an elevation of the baffle ring of that side of the motor which confronts the spacing element;

Figure 5 is an elevation of this baffle ring looking from the left in Figure 4;

Figure 6 is a fragmentary elevation of the spacing member showing a hand hold;

Figure 7 is a fragmentary section on the line 7—7 of Figure 5, showing a pressure vent;

Figure 8 is a fragmentary section through the compressor on the line 8—8 of Figure 1;

Figure 9 is a vertical section through the motor, the section being largely diagrammatic.

Referring particularly now to Figure 1, 10 designates the casing of the compressor and 11 designates generally the casing of the motor. The compressor casing is surrounded by a water jacket 12 and the casing of the motor is surrounded by a like water jacket 13. There is thus a water space entirely around the circumferential face of the compressor and of the motor.

Attached to the outer end of the compressor casing is an annular head 15 and attached to the casing of the motor is an annular head 16. These heads are formed to provide proper bearings for a shaft 17, these bearings including the usual stuffing boxes 18 with their glands, packing rings, etc. This particular bearing, stuffing boxes, etc., forms no part of my invention.

Leading into the space defined by the water jacket 12 is a water inlet 19 and leading into the space defined by the water jacket 13 is a water inlet 20. The spaces defined by the water jackets 13 and 12 are connected by connecting pipe 21 which leads to a water outlet pipe 22 which, of course, may lead to the radiator while the inlets 19 or 20 may be also connected to the same radiator.

Mounted upon the shaft 17 is the compression motor 23 and the motor rotor 24. Mounted against each face of the rotor 23 are the baffle plates 25 and 26 which, it will be noted from Figure 1, are greater in diameter than the rotor 23 and extend into recesses in the casing 10.

The peripheries of these baffle plates are provided with the two confronting packing rings 27. The rotor 23 is provided with four pivoted pistons one of which is shown in Figure 1 and designated 28 and one of which is illustrated in Figure 8. Each of these pistons 28 is mounted upon trunnions 29 and 30 and extend into suitable bearings 31 formed in the baffle plates 25 and 26. The outermost trunnion extends out beyond the baffle plate and is there provided with a counter-weight 32 which acts to counter-balance the centrifugal force exerted by the piston so as to prevent the pistons bearing too heavily against the outer wall 10. A spring 33, however, acts to urge the piston outward. This is fully shown in my pending application for patent and as it forms no part of my present invention, need not be further described.

Each piston 28 as shown in Figure 8 is disposed within a piston recess 34 formed in the rotor. It is to be noted that the trunnion 29 is tubular so as to provide a transversely extending passage 35 opening upon the ends of the trunnion. It will be seen that the head 15 encloses the bearings for the outer ends of the trunnions and provides a pressure equalizing chamber designated generally 36 in Figure 1.

The rotor 24 is constructed in precisely the same manner as the rotor 23 and is provided with the outer baffle plate 37, as shown in Figure 1, and the inner baffle plate 38, these baffle plates being formed to provide bearings 39$^a$ for the trunnions 39 of pistons 40, these pistons being constructed as illustrated in Figure 8, but reversed from the direction shown in Figure 8. These pistons 40 are counter-balanced by the weights 41 mounted upon the outer ends of the trunnions 39 and are urged against the periphery of the rotor casing by the springs 42. It will be understood that the springs 42 and the springs 33 are very light springs and only act to urge the pistons to their projected position when the engine is at rest and when no centrifugal force acts to urge the pistons outward. Baffle plates 37 and 38 are greater in diameter than the diameter of the rotors and extend into recesses in the casing wall 11 as shown in Figure 1, these baffle plates carrying the packing members 43 on their peripheries. It will be seen that the head 16 defines the outer wall of a compression space 44 corresponding to the compression space 36. It will likewise be understood that the trunnions of the pistons 40 are formed with the equalizing passages 45 corresponding to the passages 35.

The spacing member which is designated generally 46 constitutes heads for the inner ends of the two rotor casings and is formed of a single casting. This casting at one end is formed to provide the annular recess 47 which constitutes a pressure equalizing chamber for the rotor 23 and coacts with the pressure equalizing chamber 36, the passages 35 through the trunnions of the pistons opening into these two chambers 47 and 36. It will be seen that any pressure leaking around either of the pairs of packing rings 27 of the baffle disks will enter one or the other of the equalizing chambers 36 or 47 and will be transmitted by the passages 35 into the other pressure equalizing chamber so that the pressure on each side of the compressing rotor 23 will be equalized at all times and it will further be noted that these baffle disks present a relatively large surface against which the pressure may bear so that practically these motors with the baffle disks are not submitted to any unequal thrust, but the thrust is the same at both ends of the rotor.

Before it is possible to consider the equalizing chamber for the inner end of the rotor 24, it is necessary to consider the construction of the spacer 46. This spacer 46 consists of what may be termed a head 48 which is held to the casing of the compressor by screws 49 or by equivalent means.

Thus this head forms part of or is held rigid with the casing of the rotor. The spacing member is formed to provide an annular web 50 whose end confronting the motor casing is flanged as at 51 to provide means whereby the screws 52 may hold this flanged head 51 to the casing 11. At the center of the spacing member 46, there is provided the hub 53 through which the shaft 17 passes, the shaft being provided with the bushing 54 between the shaft and the hub 53. The hub 53 is connected to the head 48 by means of the radial strengthening webs 55. The annular web 50 is formed at two points with fuel chambers or pockets 56 having ports 57 opening upon the inside face of the annular web 50. The annular web is also formed with an annular water space 58 which is partially intersected by the walls of the pockets 56. Ducts 59 lead from the water jacket 12 into this water passage 58 and lead from this water passage 58 as shown in Figure 1 into the water packet 13 so that thus there is a continual circulation of cooling water around the spacing member so as to keep it cool and so as to keep the compressed gas within the pockets or chambers 56 cool.

The baffle disk 38 is formed as illustrated in Figure 4, with an outwardly projecting annular web 60 which extends into the annular chamber or space defined between the web 50 and the hub 53. The face of this annular flange or web 60 is formed at four points with inlet ports 61 as shown most clearly in Figure 4, these ports in the rotation of the baffle disk 38 with the rotor sweeping past the ports 57 taking gas from these ports. Packing rings are disposed in the packing ring grooves 62 and 63 shown particularly in Figure 4 which are disposed on each side of the port 61, the packing in these packing rings bearing against the inner face of the inner web 50.

By this construction, it will be seen that any leakage past either of the packing rings of either of the rotors will pass into the chambers 36 and 47 of the compression rotor or into the chambers 44 and 55 of the motor. The pressure within the piston chamber of the motor will be ordinarily from 300 to 400 lbs. while the pressure within the piston chamber of the compressor will be approximately 100 lbs. Obviously there will be a greater pressure upon the outside of the packing rings and the outside of the ports 57 than there will be on the inside thereof so that if the pressure builds up within these compression chambers, this pressure will act to prevent any loss of gas from the gas chambers 56 and if the exhaust from the piston chamber of the motor should pass these packing rings disposed within the grooves, it would simply result in a slight contamination of the incoming gas in the chambers 56 by exhaust products. This contamination would be very slight and will not in any way affect the quality of the vaporized fuel passing from the chambers 56 into the inlet ports of the motor. The ports 61 are formed in the extremities of ducts 64, which ducts extend laterally through the baffle plate 38, as shown most clearly in Figures 1, 4 and 5. This baffle plate 38 is provided with bolts which pass through bolt holes 65 as shown in Figure 5 and extend entirely through the rotor 24 and into the opposite baffle plate, thus holding these baffle plates securely with the rotor. The baffle plates on the compression rotor are also connected to the compression rotor by bolts. These bolts are not shown as obviously other connections might be made and furthermore such a construction is obvious from Figure 5.

For the purpose of supplying lubricant to all of the bearings of the two rotors and its shaft, I provide each of the rotors with a plurality of longitudinally extending oil channels 66, these ducts or channels being disposed outward of the shaft 17. Each of these ducts or channels at the outer end of the rotor intersects a circumferential groove 67 and opening into this groove is an oil duct 68 leading to the outer surface of the corresponding head 15 whereby oil may be forced by a pressure lubricator into the annular ducts 67 and from thence into the duct 66. A branch duct 68 leads from the duct 67 to the shaft bearings in the heads 15 or 16 as the case may be. Opening from the channels 66 in each rotor are a plurality of radial channels or ducts 69 which at their outer ends intersect the seat formed in the rotor for the back of each of the pistons so that the rounded back of the pistons as shown in Figure 8 is lubricated where these rounded backs of the pistons contact with the rotors. Each of the baffle rings for the two rotors is provided with a plurality of radial channels 70 opening at their inner ends to the ducts 66 and extending outward, lubricating the bearings for the trunnions and also lubricating the packing rings 43, as shown most clearly in Figure 1. These packing rings are stationary while the baffle plates revolve and obviously lubrication must be provided for these packing rings. Furthermore the provision of oil at this point tends to form a sealing ring around the packing rings, and prevent the passage of pressure.

For the purpose of lubricating the shaft bearing in the spacer, I provide a vertically extending oil duct 70a extending down through the end wall of the spacer and opening at the upper end of this wall as shown in Figure 1.

This duct opens into a longitudinally extending duct 71 which is disposed immediately outward of the bushing 54. This bushing is formed with a plurality of ports 72 whereby oil may pass through the bushing to the shaft and the inner face of the bushing is formed with a plurality of grooves 73 which surround the shaft. Of course, I do not wish to be limited to any particular oiling system.

As shown in Figures 3 and 6 the spacer is formed in its peripheral wall with hand holds 74 for the purpose of doing the necessary machining in the ports. These handholds are, of course, to be closed after the machining has been done. In order to permit any exhaust gases which may be forced around the baffle rings 43 to pass into the annular chamber 55, and thus secure a proper equalization of pressure, I provide a plurality of ducts one of which is shown in Figure 7 and which is designated 75. This passes through the wall 60 as shown in Figures 4 and 5. Without these vents 75, the pressure could not pass the wall 60 of the baffle ring and into the space between the wall 60 and the confronting wall of the spacer. Without these vents, there would be an unequal pressure on the opposite sides of the baffle disks, but by providing these vents, the same area of pressure is provided against the outer face of one baffle disk of the motor as there is against the other baffle disk of the motor.

From Figures 1 and 8, it will be seen that the compression chamber of casing 10 is provided with outlet ports opening into outlet passages 76. These passages lead by pipe 77 to inlet port 78 extending through the outer wall of the spacer 46 circumferentially extending webs or flanges of the spacer as shown in Figure 3, and opening into the pockets 56.

Mounted in each outlet passage 76 is a check valve 79 held closed by a spring 80, this bearing at its outer end against the inner end of the tubular member 81 and having the spider 82 at its outer end engaged with the wall of the flanged base 83 of pipe 77. The tubular member is smaller in diameter than the passage 76 so that the compressed fluid can pass out around the outer end of the tubular member and through the spider into the outlet pipe 77 and thus to the corresponding pockets 56 from which it is discharged intermittently to ducts 61. It will be seen that each passage 76 with pipe 77 and pocket 56 constitutes a manifold and that by the provision of the check valve 79, the compression will be built up within the said manifold to desired amount and that by this construction, the check valve is disposed at that end of the manifold which is most remote from the explosion chambers of the motor. It is further to be particularly noted in this connection that the explosion only occurs when the inlet ducts 64 have passed the outlet ports 57 of the manifolds so that no explosive forces are transmitted to the fluid in the pockets 56 and thus to the contents of the manifolds to the valves.

The motive fluid is transmitted to the compressor by the pipe 83 shown in Figure 1 which leads from any suitable source of motive fluid, as for instance, from the carbureter. While I have indicated in Figure 8 that the rotors are provided with swinging blades or pistons urged outward normally by centrifugal force, I do not wish to be limited to this in the present case, except as may be stated in the claims, as this present invention is directed to the provision of an intermediate spacing element disposed between the compressor and the motor of an internal combustion engine, the rotor of the motor having what may be termed a runner (60) rotating relative to the spacer, this runner being intermittently communicatively connected to the manifold passages of the spacer and it being intermittently cut off therefrom whereby to carry out the purposes of my invention.

I have illustrated in Figure 5, bearings for the trunnions of four piston blades 40. Obviously, however, I do not wish to be restricted to these four piston blades, nor to the number of compressing pistons in the compressor.

In the operation of this construction, the rotor of the compressor and the piston blades carried by the rotor act successively to draw in a charge from the carbureter by means of the pipe 83 and will then compress this charge and force the charge into the respective pockets 56, there being two of these pockets as shown clearly in Figure 3. As the ports 61 register with the ports 57, the charge will be drawn into the motor and specifically into a charge measuring pocket 84, as shown most clearly in Figure 9, it is then exploded by any suitable ignition mechanism in an obvious manner to cause the rotation of the rotor and discharged from the usual exhaust ports.

I claim:—

1. In a rotary internal combustion engine, a rotary compressor and a rotary motor both provided with water jackets, and an intermediate spacer formed in two sections, one section being attached to the casing of the compressor and to the casing of the motor, the other section being mounted to rotate with the rotor of the motor, the first named section having a plurality of discharge ducts leading from the compressor and having outlet ports, the second section having a plurality of inlet ducts having inlet ports coacting with the discharge ports and intermittently registering with the discharge ports and discharging into the motor, water jackets surrounding the compressor and the motor, and a water jacket formed in said spacer and surrounding the ducts thereof, the water jackets of the compressor, spacer and motor being all connected in a circulating system.

2. In a rotary internal combustion engine, a rotary compressor having a casing and a rotor, a motor having a casing and a rotor, a head forming one end of the compressor casing and formed with an outwardly projecting annular flange, ducts formed in said head and leading to the interior of the compressor casing, the inner face of the flange of the head having discharge ports communicating with said ducts, the rotor of the motor having an element rotating therewith formed to provide an inwardly extending annular flange concentric to the flange on the opposite head, this flange being formed to provide a series of inlet ducts to the motor having ports adapted to register with the ports of the first named flange intermittently as the rotor operates, and a water jacket forming part of said head and enclosing the last named ducts.

3. In a rotary internal combustion engine, a compressor comprising a casing and a rotor therein, a motor comprising a casing and a rotor therein, heads closing the outer ends of the casing, an intermediate spacing element constituting a head closing the inner end of the compressor casing and the adjacent end of the motor casing, said intermediate element attached to the compressor casing and the motor casing and being formed to provide a hub flange and an outer circumferentially extending flange, the last named flange being formed with a series of ports and with ducts leading from said ports into the compressor, said flange defining a circular opening on the side toward the motor, the rotor of the motor having at its inner end an element having an inwardly extending annular flange confronting the outer flange of the intermediate element and having ports adapted to intermittently register with the ports in said flange, and having ducts leading from said ports into the interior of the motor casing, the space between the outer flange on the intermediate element and the flange on the rotor of the motor constituting a water space, said water space having an inlet and an outlet.

4. In a rotary internal combustion engine, a compressor comprising a casing and a rotor therein, a motor comprising a casing and a rotor therein, heads closing the outer ends of the casing, an intermediate spacing element constituting a head closing and attached to the inner end of the compressor casing and closing and attached to the adjacent end of the motor casing, said intermediate element being formed to provide a hub flange and an outer circumferentially extending flange, the last named flange being formed with a series of pockets having outlet ports and with ducts leading from said pockets into the compressor, said flange defining a circular opening on the side toward the motor, the rotor of the motor having at its inner end an element having an inwardly extending annular flange confronting the outer flange of the intermediate element and having ports adapted to intermittently register with the ports in said pockets, and having ducts leading from said ports into the interior of the motor casing, the space between the outer flange on the intermediate element and the flange on the rotor of the motor constituting a water space, the casing of the compressor and the casing of the rotor being water jacketed and said water space in the intermediate element being communicatively connected to the water jackets, and means for causing the circulation of water through said water jackets and water space.

5. In a rotary internal combustion engine, a rotary compressor having a casing with a rotor, a motor having a casing with a rotor, both of said rotors having laterally disposed baffle disks mounted for rotation with the rotor and projecting beyond the same, and having sealing rings on their peripheries, a head forming the outer wall of the compressor casing, a head forming the outer wall of the motor casing, there being a space between each head and the confronting baffle disk, a spacer between the motor and the compressor, the spacer being formed to provide a head for the adjacent end of the compressor casing, and a head for the adjacent end of the motor casing, there being spaces between each of said heads and the adjacent confronting baffle disks, the rotors of the compressor and the motor each having transversely extending equalizing passages opening into said spaces whereby to equalize the pressure on opposite ends of the rotors, said spacer being formed to provide a plurality of inwardly directed ports, and ducts leading from the compressor to said ports, the inner baffle disk of the motor rotor being formed to provide inwardly directed inlet ducts having ports adapted to register intermittently with the ports in the spacer element, the spacer element being formed to provide an annular water chamber whereby to cool the motive fluid passing into the motor.

6. In an internal combustion engine of the character described, a compressor casing, a motor casing, rotors in the two casings, the compression rotor having oppositely disposed baffle disks provided with circumferential packing rings, a head on the exterior end of the compressor, a head on the exterior end of the motor casing, an intermediate spacer formed to provide a head for the inner end of the compressor and a head for the inner end of the motor, the heads thus providing pressure chambers at opposite ends of the baffle disks of each rotor, each rotor being formed to provide passages extending transversely across the rotor and opening into said pressure chambers, the intermediate element being formed to provide a hub and an annular flange having outlet ports and ducts leading from said ports into the compressor and receiving compressed fluid therefrom, the baffle disk on the inner end of the rotor of the motor having an inwardly projecting annular flange facing the flange on the intermediate element and formed to provide a plurality of ports registrable with the ports in said first named flange and having ducts leading into the interior of the motor, there being an annular space between the annular flange on the baffle disk and the hub, said space communicating with the pressure chamber on the adjacent side of the motor, the confronting faces of the two flanges on each side of the ports thereof having annular packing rings, the annular flange projecting from the baffle ring adjacent its point of intersection with the baffle ring being provided with vent openings extending through the annular flange and affording communication between the pressure chamber on the outside of the inner baffle disk of the motor and the annular chamber defined between the hub and the annular flange.

In testimony whereof I hereunto affix my signature.

RALPH J. MEYER.